(12) United States Patent
Nagano et al.

(10) Patent No.: US 12,174,623 B2
(45) Date of Patent: Dec. 24, 2024

(54) PLANT MONITORING DEVICE, METHOD AND PROGRAM USING A CORRECTED MAHALANOBIS DISTANCE TO DETERMINE PLANT ABNORMALITY

(71) Applicant: Mitsubishi Power, Ltd., Kanagawa (JP)

(72) Inventors: Ichiro Nagano, Yokohama (JP); Mayumi Saito, Tokyo (JP); Keiji Eguchi, Tokyo (JP); Kuniaki Aoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 386 days.

(21) Appl. No.: 17/620,874

(22) PCT Filed: Jul. 17, 2020

(86) PCT No.: PCT/JP2020/027840
§ 371 (c)(1),
(2) Date: Dec. 20, 2021

(87) PCT Pub. No.: WO2021/020170
PCT Pub. Date: Feb. 4, 2021

(65) Prior Publication Data
US 2022/0350320 A1 Nov. 3, 2022

(30) Foreign Application Priority Data
Aug. 1, 2019 (JP) .................... 2019-142330

(51) Int. Cl.
*G05B 23/02* (2006.01)
(52) U.S. Cl.
CPC .................... *G05B 23/02* (2013.01)
(58) Field of Classification Search
CPC ..... G05B 23/02; G05B 23/024; F01K 23/101; F02C 6/18; F02C 9/00; F02C 7/00;
(Continued)

(56) References Cited

U.S. PATENT DOCUMENTS

| 4,893,230 A * | 1/1990 | Shimomura | G05B 15/02 700/83 |
| 6,200,021 B1 * | 3/2001 | Mitsutani | F01P 11/16 374/1 |

(Continued)

FOREIGN PATENT DOCUMENTS

| JP | 58-189708 | 11/1983 |
| JP | 2011-238148 | 11/2011 |

(Continued)

OTHER PUBLICATIONS

International Search Report issued Oct. 6, 2020 in International (PCT) Application No. PCT/JP2020/027840, with English-language translation.

(Continued)

*Primary Examiner* — Kenneth M Lo
*Assistant Examiner* — Jonathan Michael Skrzycki
(74) *Attorney, Agent, or Firm* — Wenderoth, Lind & Ponack, L.L.P.

(57) ABSTRACT

A plant monitoring device (20) is provided with: a state quantity acquiring unit (211) which acquires state quantities for each of a plurality of characteristic items relating to a plant; an abnormality degree calculating unit (212) which calculates a degree of abnormality representing a degree of approach toward an abnormal side relative to a limit value that is predetermined for each characteristic item, for the state quantities acquired at a plant monitoring timing; a distance calculating unit (213) which uses a statistical technique to calculate distances representing the degrees of separation, from the normal operating state of the plant, of the state quantity and the degree of abnormality acquired at the monitoring timing; and a determining unit (214) which determines the operating state of the plant on the basis of the calculated distances.

5 Claims, 7 Drawing Sheets

(58) Field of Classification Search
CPC ....... G01M 15/14; G01M 99/00; F01D 21/20; F01D 21/003; F01D 25/00; F05D 2260/80; F05D 2270/70; G01D 21/02
See application file for complete search history.

(56) References Cited

U.S. PATENT DOCUMENTS

| | | | | |
|---|---|---|---|---|
| 2002/0188415 | A1* | 12/2002 | Fujimoto | G05B 23/0286 |
| | | | | 702/132 |
| 2010/0198555 | A1 | 8/2010 | Takahama et al. | |
| 2015/0293531 | A1* | 10/2015 | Mikami | G05B 23/0235 |
| | | | | 702/182 |
| 2016/0012651 | A1 | 1/2016 | Mouterde | |
| 2016/0116892 | A1* | 4/2016 | Cheng | G05B 19/048 |
| | | | | 700/108 |
| 2019/0018402 | A1* | 1/2019 | Enomoto | G05B 23/0235 |
| 2021/0173383 | A1 | 6/2021 | Nagano et al. | |

FOREIGN PATENT DOCUMENTS

| | | |
|---|---|---|
| JP | 2012-67757 | 4/2012 |
| JP | 2018-81523 | 5/2018 |
| JP | 2018-173948 | 11/2018 |
| JP | 2019-113964 | 7/2019 |
| KR | 10-1724444 | 4/2017 |

OTHER PUBLICATIONS

Written Opinion of the International Searching Authority issued Oct. 6, 2020 in International (PCT) Application No. PCT/JP2020/027840, with English-language translation.

* cited by examiner

PLANT MONITORING DEVICE, METHOD AND PROGRAM USING A CORRECTED MAHALANOBIS DISTANCE TO DETERMINE PLANT ABNORMALITY

TECHNICAL FIELD

The present invention relates to a plant monitoring device, a plant monitoring method, and a program.

Priority is claimed on Japanese Patent Application No. 2019-142330 filed on Aug. 1, 2019, the content of which is incorporated herein by reference.

BACKGROUND ART

In various types of plants, such as a gas turbine power generation plant, an atomic power generation plant, and a chemical plant, a bundle of detection values (state quantities) of each of a plurality of evaluation items (temperature and pressure) is acquired, and whether or not the plant is operating normally is monitored based on the tendencies of the detection values. For example, PTL 1 describes a technique of calculating a Mahalanobis distance of a bundle of detection values acquired at an evaluation time point with a unit space configured by a plurality of bundles of detection values as a reference and determining that there is a sign indicating a normal or abnormal operation state of a plant in a case where the Mahalanobis distance exceeds a threshold value determined in advance.

CITATION LIST

Patent Literature

[PTL 1] Japanese Unexamined Patent Application Publication No. 2012-67757

SUMMARY OF INVENTION

Technical Problem

In a facility of the plant, limit values that define a normal range are provided in some cases for a detection value (for example, the capacity and water level of a boiler tank) from a sensor. However, in a method of the related art, in which the presence or absence of an abnormality is detected using a Mahalanobis distance, the limit values of the detection value are not used in abnormality detection. In that case, even when the detection value of a certain sensor is close to the limit value, there is a possibility that a sign of an abnormality of the plant cannot be detected in a case where the Mahalanobis distance is within the threshold value.

The present invention is devised in view of such a problem, and provides a plant monitoring device, a plant monitoring method, and a program, in which an abnormality of the plant can be detected at an early stage.

Solution to Problem

According to a first aspect of the present invention, there is provided a plant monitoring device for monitoring an operation state of a plant, the device including a state quantity acquisition unit that acquires a state quantity of each of a plurality of characteristic items of the plant, an abnormality degree calculation unit that calculates, for the state quantity acquired at a monitoring timing of the plant, an abnormality degree indicating a degree of approach to an abnormality side with a limit value set in advance for each characteristic item as a reference, a distance calculation unit that calculates distances of the state quantity and the abnormality degree acquired at the monitoring timing, which indicate a degree of separation from a normal operation state of the plant, using a statistical method, and a determination unit that determines the operation state of the plant based on the calculated distance.

According to a second aspect of the present invention, in the plant monitoring device according to the first aspect, the distance calculation unit calculates a Mahalanobis distance of the state quantity acquired at the monitoring timing with a unit space formed by the state quantity acquired when the operation state of the plant is normal as a reference, and calculates a composite distance obtained by correcting the Mahalanobis distance based on a maximum value among a plurality of the calculated abnormality degrees as the distance, and the determination unit determines that the operation state of the plant is abnormal in a case where the composite distance is larger than a predetermined threshold value.

According to a third aspect of the present invention, in the plant monitoring device according to the first aspect, the distance calculation unit corrects the state quantity acquired at the monitoring timing with the abnormality degree and calculates a Mahalanobis distance of the corrected state quantity as the distance with a unit space formed by the state quantity acquired when the operation state of the plant is normal as a reference, and the determination unit determines that the operation state of the plant is abnormal in a case where the Mahalanobis distance is larger than a predetermined threshold value.

According to a fourth aspect of the present invention, in the plant monitoring device according to the first aspect, the distance calculation unit calculates a Mahalanobis distance of the abnormality degree as the distance with a unit space formed by the abnormality degree acquired when the operation state of the plant is normal as a reference, and the determination unit determines that the operation state of the plant is abnormal in a case where the Mahalanobis distance is larger than a predetermined threshold value.

According to a fifth aspect of the present invention, in the plant monitoring device according to the second to fourth aspects, the abnormality degree calculation unit calculates the abnormality degree such that a value of the abnormality degree when the state quantity has reached the limit value matches the threshold value.

According to a sixth aspect of the present invention, in the plant monitoring device according to the first to fifth aspects, an S/N ratio calculation unit that calculates an S/N ratio for each characteristic item based on the state quantity and the abnormality degree which are acquired at the monitoring timing and a cause estimation unit that estimates a cause of an abnormality of the plant based on the calculated S/N ratio in a case where the determination unit determines that the operation state of the plant is abnormal are further included.

According to a seventh aspect of the present invention, there is provided a plant monitoring method for monitoring an operation state of a plant, the method including a step of acquiring a state quantity of each of a plurality of characteristic items of the plant, a step of calculating, for the state quantity acquired at a monitoring timing of the plant, an abnormality degree indicating a degree of approach to an abnormality side with a limit value set in advance for each characteristic item as a reference, a step of calculating distances of the state quantity and the abnormality degree acquired at the monitoring timing, which indicate a degree of separation from a normal operation state of the plant, using a statistical method, and a step of determining the operation state of the plant based on the calculated distance.

According to an eighth aspect of the present invention, there is provided a program that causes a computer of a plant monitoring device for monitoring an operation state of a plant to function, the program causing the computer to execute a step of acquiring a state quantity of each of a plurality of characteristic items of the plant, a step of calculating, for the state quantity acquired at a monitoring timing of the plant, an abnormality degree indicating a degree of approach to an abnormality side with a limit value set in advance for each characteristic item as a reference, a step of calculating distances of the state quantity and the abnormality degree acquired at the monitoring timing, which indicate a degree of separation from a normal operation state of the plant, using a statistical method, and a step of determining the operation state of the plant based on the calculated distance.

Advantageous Effects of Invention

With the plant monitoring device, the plant monitoring method, and the program according to any one of the aspects described above, an abnormality of the plant can be detected at an early stage.

DESCRIPTION OF EMBODIMENTS

Hereinafter, a plant monitoring device according to an embodiment of the present invention will be described with reference to FIGS. 1 to 7.

A plant monitoring device 20 according to the present embodiment is a device for monitoring an operation state of a plant 1 at each predetermined monitoring timing (for example, one hour). The plant monitoring device 20 determines whether the operation state of the plant 1 is normal or abnormal using the Mahalanobis Taguchi method (hereinafter, also referred to as the MT method), and estimates a cause of an abnormality.
(Outline of Plant)

Figure 1:
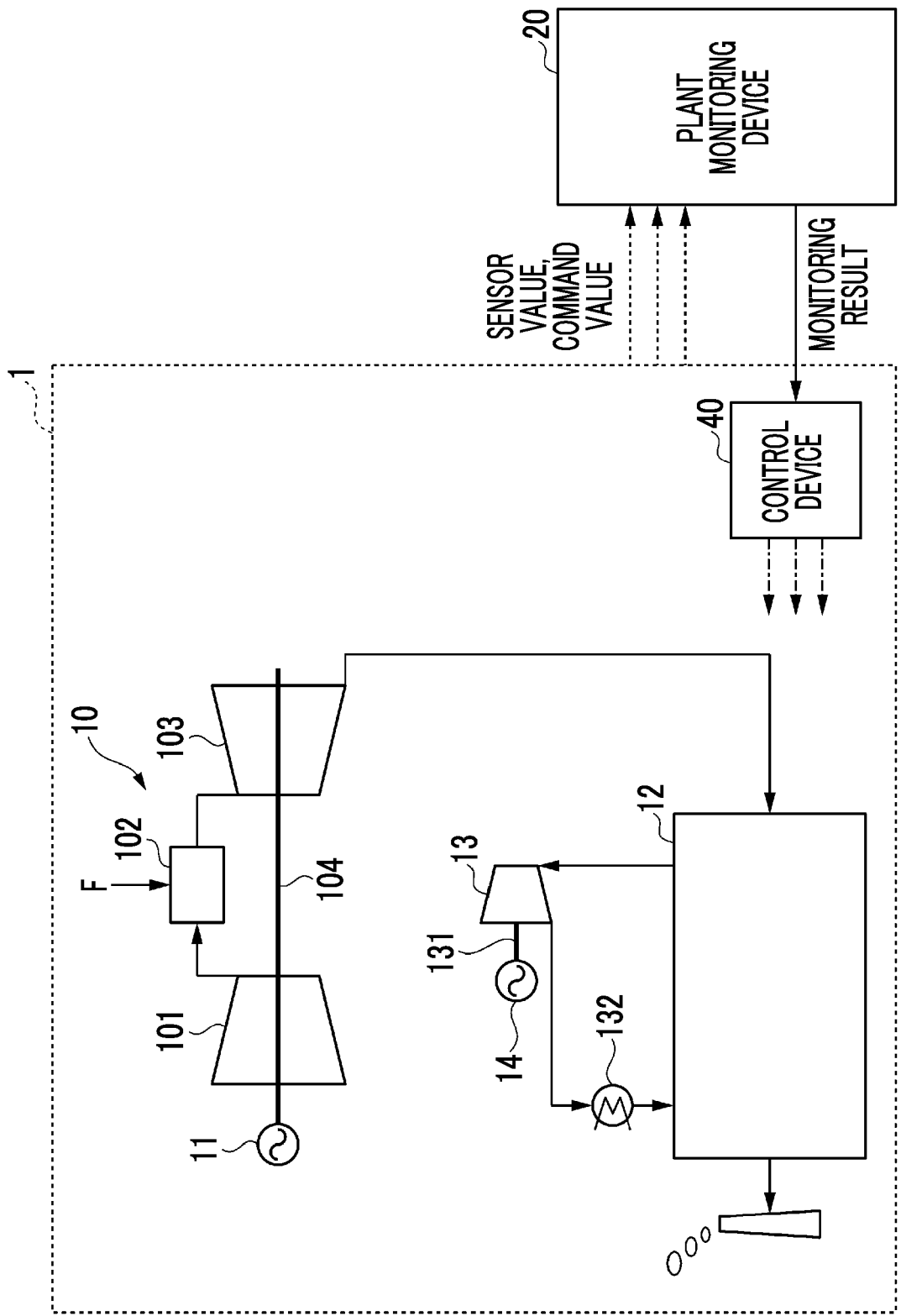
FIG. 1 is a schematic diagram of a plant, which is an example of a monitoring target according to an embodiment of the present invention.

FIG. 1 is a schematic diagram of the plant, which is an example of a monitoring target according to the embodiment of the present invention.

As shown in FIG. 1, the plant 1 according to the present embodiment is a gas turbine combined cycle power generation plant, and includes a gas turbine 10, a gas turbine generator 11, a heat recovery steam generator 12, a steam turbine 13, a steam turbine generator 14, and a control device 40. In another embodiment, the plant 1 may be a gas turbine power generation plant, an atomic power generation plant, or a chemical plant.

The gas turbine 10 includes a compressor 101, a combustor 102, and a turbine 103. The compressor 101 compresses air taken in from a suction port. The combustor 102 mixes a fuel F with the compressed air introduced from the compressor 101 to combust the mixture, and generates a combustion gas. The turbine 103 is rotationally driven by the combustion gas supplied from the combustor 102. The gas turbine generator 11 is connected to a rotor 104 of the turbine 103 via the compressor 101, and generates power through the rotation of the rotor 104. The heat recovery steam generator 12 heats water with the combustion gas (exhaust gas) exhausted from the turbine 103, and generates steam. The steam turbine 13 is driven by the steam from the heat recovery steam generator 12. In addition, the steam exhausted from the steam turbine 13 is converted back to water by a condenser 132, and is sent to the heat recovery steam generator 12 via a water supply pump. The steam turbine generator 14 is connected to a rotor 131 of the steam turbine 13, and generates power through the rotation of the rotor 131.

In addition, a plurality of sensors (not shown) are attached to each unit of the plant 1. Examples of a sensor value detected by each sensor include an atmospheric pressure, an atmospheric temperature, an inlet air temperature and an outlet air temperature of an interior chamber of the compressor 101, a pressure inside the interior chamber of the compressor 101, a pressure of the fuel F supplied to the combustor 102, an inlet combustion gas temperature and an outlet combustion gas temperature of an interior chamber of the turbine 103, a pressure inside the interior chamber of the turbine 103, an output of the gas turbine generator 11, a water level of the heat recovery steam generator 12, a temperature inside an interior chamber of the steam turbine 13, an output of the steam turbine generator 14, and rotation speeds and vibrations of the rotor 104 and the rotor 131.

The control device 40 controls an operation of each unit of the plant 1 automatically according to the operation state of the plant 1 or by receiving an operation from an operator.
(Functional Configuration of Plant Monitoring Device)

Figure 2:
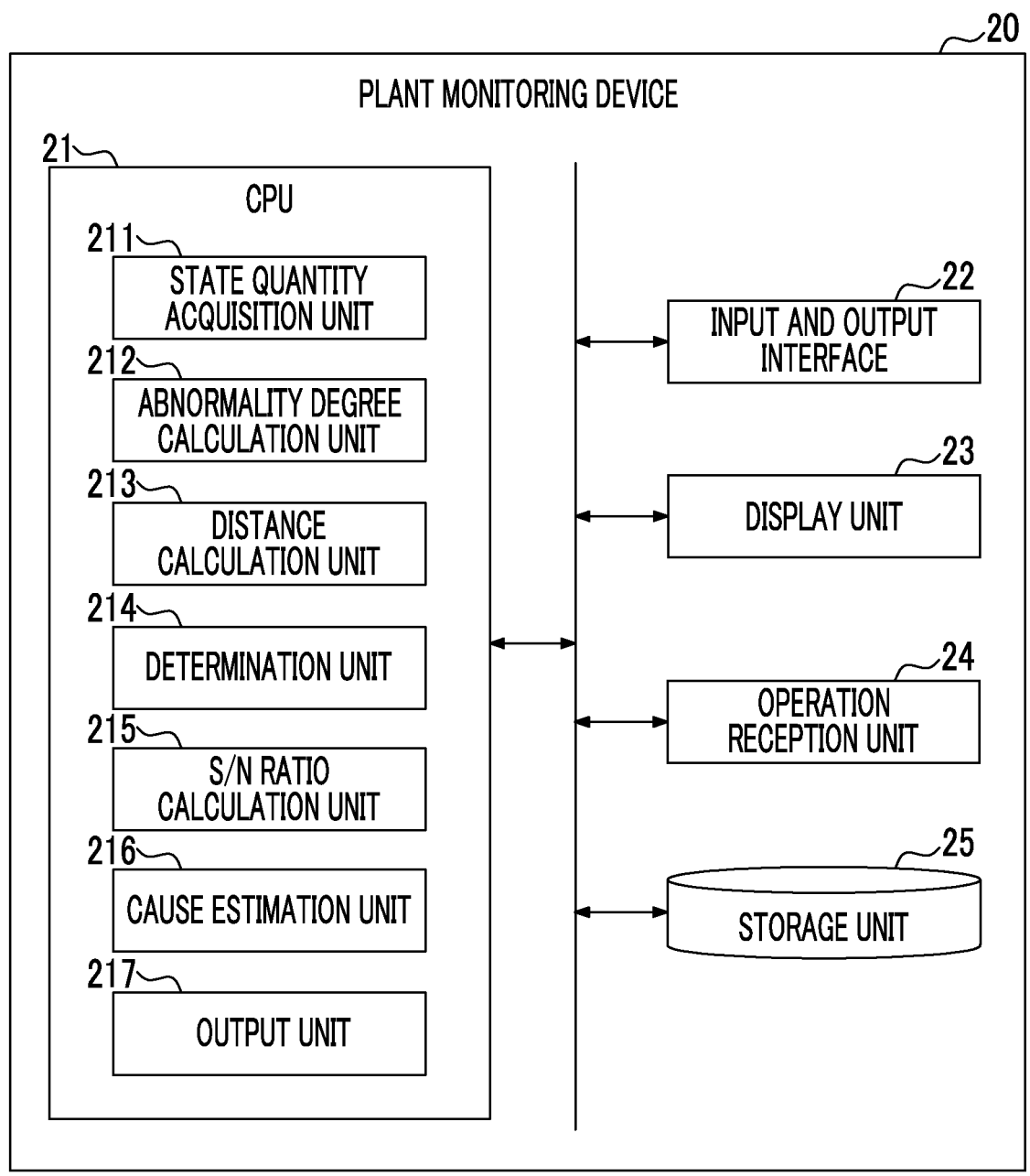
FIG. 2 is a diagram showing a functional configuration of a plant monitoring device according to the embodiment of the present invention.

FIG. 2 is a diagram showing a functional configuration of the plant monitoring device according to the embodiment of the present invention.

As shown in FIG. 2, the plant monitoring device 20 is a computer including a CPU 21, an input and output interface 22, a display unit 23, an operation reception unit 24, and a storage unit 25.

The input and output interface 22 receives an input of a state quantity for each of a plurality of characteristic items from the sensor attached to each unit of the plant 1.

The display unit 23 is a display for displaying various types of information related to the monitoring of the plant 1. For example, in a case where the abnormality of the plant 1 is determined to be abnormal, the display unit 23 displays abnormality information including information related to a characteristic item estimated to be a cause of the abnormality.

The operation reception unit 24 is a device such as a keyboard and a mouse for receiving operations from an operator who monitors the plant 1.

The CPU 21 is a processor that controls an operation of the entire plant monitoring device 20. The CPU 21 functions as a state quantity acquisition unit 211, an abnormality degree calculation unit 212, a distance calculation unit 213, a determination unit 214, an S/N ratio calculation unit 215, a cause estimation unit 216, and an output unit 217 by executing various types of arithmetic processing in accordance with a program prepared in advance.

The state quantity acquisition unit 211 acquires a sensor value measured by each of the plurality of sensors provided in the respective units of the plant 1 and the value (command value) of a control signal of the plant 1 via the input and output interface 22. The sensor value and the command value are examples of a state quantity for each characteristic item in the present embodiment. The state quantity acquisition unit 211 acquires a state quantity at each predetermined time (for example, one minute), and stores and accumulates the state quantity in the storage unit 25.

The abnormality degree calculation unit 212 calculates, for a state quantity acquired at the monitoring timing of the plant 1, an abnormality degree indicating a degree of approach to an abnormality side with a limit value set in advance for each characteristic item as a reference.

The distance calculation unit 213 calculates distances of the state quantity and the abnormality degree acquired at the monitoring timing of the plant 1, which indicate a degree of separation from a normal operation state of the plant 1, using a statistical method. Specifically, the distance calculated by the distance calculation unit 213 is a Mahalanobis distance. The Mahalanobis distance is a measure indicating a magnitude of difference between a reference (at normal times) sample indicated as a unit space and a new sample (the state quantity and the abnormality degree) acquired at the monitoring timing.

The determination unit 214 determines the operation state of the plant 1 based on the distance (Mahalanobis distance) calculated by the distance calculation unit 213. Specifically, in a case where the Mahalanobis distance is equal to or larger than a predetermined threshold value, the determination unit 214 determines that the operation state of the plant 1 is abnormal. The threshold value may be a fixed value set in advance, or may be updated to a new value at each monitoring timing based on the operation state of the plant 1 in a period from an evaluation time point to a predetermined time in the past.

The S/N ratio calculation unit 215 calculates an S/N ratio (signal-to-noise ratio) according to the Taguchi method for each characteristic item based on the distance calculated by the distance calculation unit 213.

In a case where the determination unit 214 determines that the operation state of the plant 1 is abnormal, the cause estimation unit 216 estimates a cause of the abnormality of the plant 1 based on the S/N ratio calculated by the S/N ratio calculation unit 215.

The output unit 217 outputs various types of information related to the monitoring of the plant 1. For example, the output unit 217 outputs a state quantity at each monitoring timing and a determination result of the presence or absence of an abnormality to the display unit 23 for display. In addition, in a case where the operation state of the plant 1 is determined to be abnormal, the output unit 217 outputs abnormality information including information related to a characteristic item estimated to be a cause of the abnormality to the display unit 23 for display. In addition, the output unit 217 may transmit the abnormality information to a terminal device (not shown) of the operator via email.

The storage unit 25 stores data acquired and generated in the processing of each unit of the CPU 21.

(Mahalanobis Distance)

Figure 3:
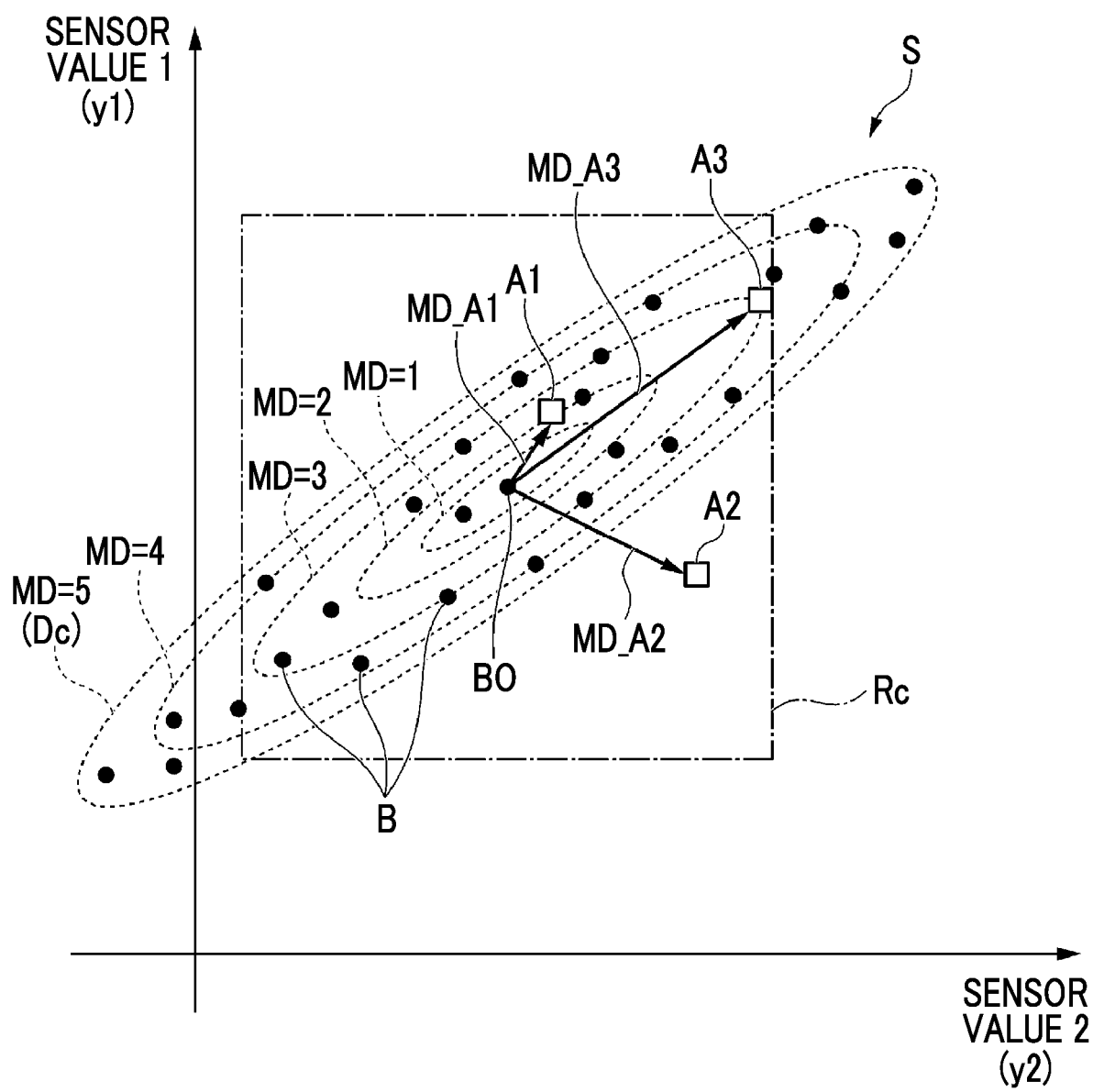
FIG. 3 is a diagram showing the concept of a Mahalanobis distance.

FIG. 3 is a conceptual diagram showing the concept of a Mahalanobis distance.

The plant monitoring device 20 according to the present embodiment determines whether the operation state of the plant 1 is normal or abnormal using the MT method. First, the outline of a plant monitoring method using the MT method will be described with reference to FIG. 3.

As shown in FIG. 3, it is assumed that the state quantity acquisition unit 211 of the plant monitoring device 20 acquires a sensor value 1 (y1) and a sensor value 2 (y2) of the plant 1 as a state quantity B (y1, y2). In the MT method, an aggregate of a plurality of state quantities B acquired at normal times of the plant 1 is set as a unit space S, which is a sample of normal times, and a Mahalanobis distance MD of a state quantity A (y1, y2) acquired at a certain time point is calculated.

The Mahalanobis distance MD is a distance that is weighted according to a variance and a correlation of sensor values for the unit space S, and has a greater value as similarity with a data group configuring the unit space S becomes lower. Herein, the average of the Mahalanobis distances MD of the state quantities B configuring the unit space S is 1, and the Mahalanobis distance MD of the state quantity A is generally 4 or less in a case where the operation state of the plant 1 is normal. However, when the operation state of the plant 1 is abnormal, the value of the Mahalanobis distance MD increases according to the degree of the abnormality. As described above, the Mahalanobis distance MD has a property that the value thereof increases according to the degree of the abnormality of the plant 1 (the degree of separation from the unit space S). FIG. 3 shows an example of equidistant lines (broken lines) when the values of the Mahalanobis distances MD are 1 to 5. In the example of FIG. 3, the value of the Mahalanobis distance MD increases to 1, 2, . . . as the distance increases from a center B0 of the unit space.

For this reason, in the MT method, it is determined that the operation state of the plant 1 is abnormal in a case where the Mahalanobis distance MD is equal to or larger than a threshold value Dc (for example, "5") determined in advance, and it is determined that the operation state of the plant 1 is normal in a case where the Mahalanobis distance is smaller than the threshold value Dc. For example, since the value of a Mahalanobis distance MD_A1 of a state quantity A1 acquired at a time t1 is smaller than the threshold value Dc, it is determined that the operation state of the plant 1 is normal at the time t1. In addition, since the value of a Mahalanobis distance MD_A2 of a state quantity A2 acquired at a certain time t2 is equal to or larger than the threshold value Dc, it is determined that the operation state of the plant 1 is abnormal at the time t2.

Herein, regardless of a variance and a correlation between sensor values, a limit value (an upper limit value and a lower limit value) is set in advance for each of the sensor value 1 and the sensor value 2. A range Rc of FIG. 3 schematically shows a range of the limit value. For example, the state quantity A2 acquired at the time t2 is included in the range Rc of the limit value for both of the sensor value 1 and the sensor value 2. For this reason, in a case where the presence or absence of an abnormality of the plant 1 is monitored only by the limit value, the operation state of the plant 1 is determined to be normal at the time t2. On the other hand, since the value of the Mahalanobis distance MD_A2 is equal to or larger than the threshold value Dc, a sign of an abnormality of the plant 1 can be detected with reference to the Mahalanobis distance MD_A2. Since it is necessary for the operator to separately perform monitoring based on the limit value and monitoring based on the Mahalanobis distance in a plant monitoring method of the related art in this manner, monitoring work is complicated.

In addition, a state quantity A3 acquired at a certain time t3 is within the range Rc of the limit value for both of the sensor value 1 and the sensor value 2, but the value of the sensor value 2 is close to the upper limit value. Thus, there is a possibility that there are signs of some abnormalities. However, in the monitoring based on the limit value, the sensor value 2 is determined to be normal since the sensor value 2 is smaller than the threshold value. Similarly, since a Mahalanobis distance MD_A3 of the state quantity A3 is smaller than the threshold value Dc, it is determined that the operation state of the plant 1 is normal in the monitoring method based on the MT method of the related art. Thus, there is a possibility that a timing when a sign of an abnormality of the plant 1 is detected is delayed in the monitoring method of the related art.

In view of this, the plant monitoring device 20 according to the present embodiment performs monitoring processing in which both of the limit value and the Mahalanobis distance are combined such that a sign of an abnormality of the plant 1 can be detected at an early stage.

(Processing Flow of Plant Monitoring Device)

Figure 4:
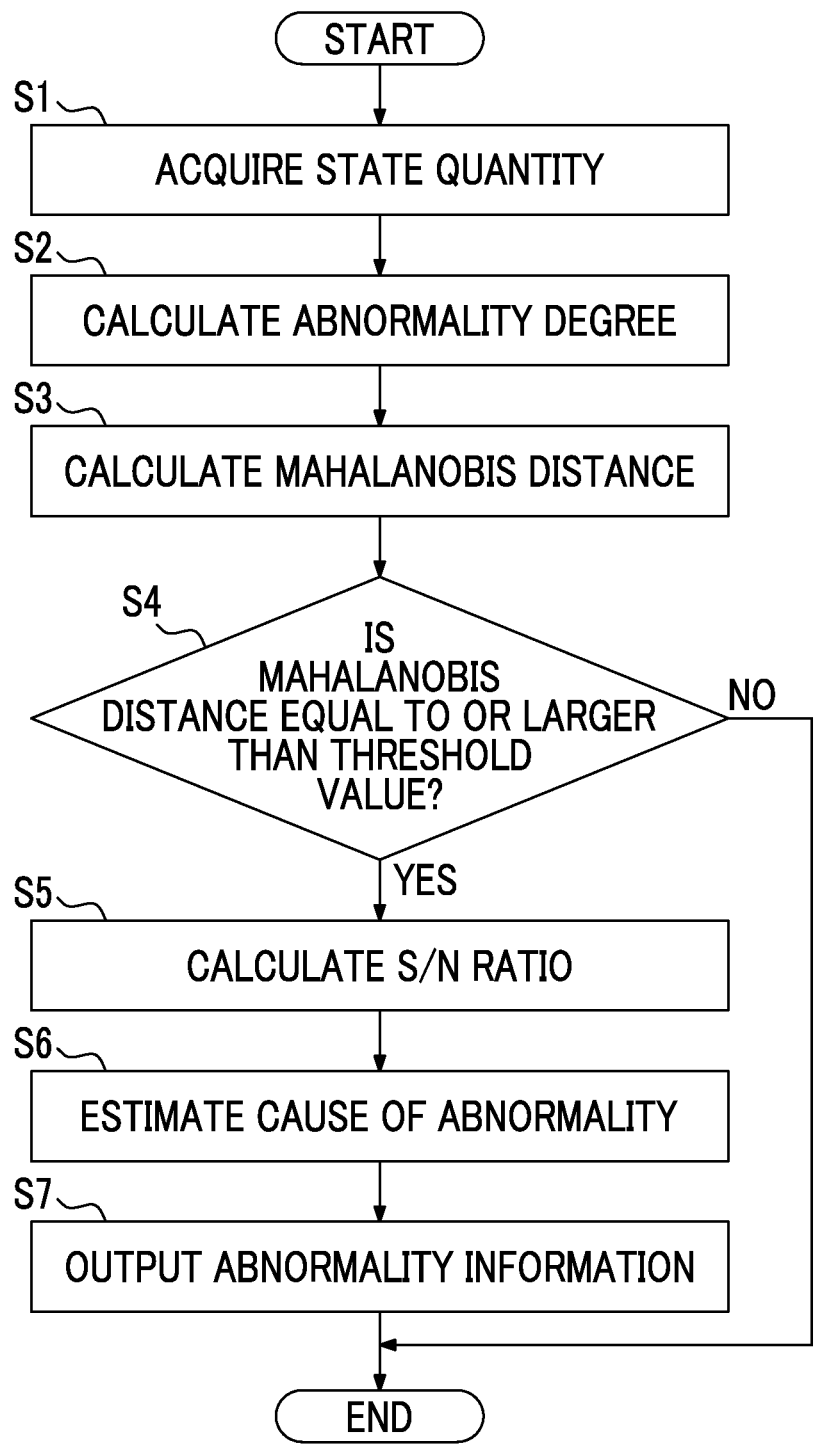
FIG. 4 is a flowchart showing an example of processing of the plant monitoring device according to the embodiment of the present invention.

FIG. 4 is a flowchart showing an example of processing of the plant monitoring device according to the embodiment of the present invention.

The plant monitoring device 20 according to the present embodiment collects a state quantity (a sensor value and a command value) of the plant 1 with the state quantity acquisition unit 211 and accumulates the state quantity in the storage unit 25 during the operation of the plant 1. The plant monitoring device 20 prepares a unit space, which is a sample of normal times, from the state quantities accumulated in this manner in the storage unit 25 and stores the unit space in the storage unit 25. In addition, the plant monitoring device 20 executes a series of types of processing for monitoring the operation state of the plant 1 shown in FIG. 4 at each predetermined monitoring timing (for example, one hour).

When the plant monitoring device 20 starts monitoring processing on the operation state of the plant 1, the state quantity acquisition unit 211 acquires state quantities of the plant 1 (Step S1).

Next, the abnormality degree calculation unit 212 calculates the abnormality degree of each state quantity acquired in Step S1 (Step S2). Herein, each of the sensor value 1 (for example, a gas turbine output) and the sensor value 2 (for example, a boiler water level) are acquired as a state quantity. In addition, each of the sensor value 1 and the sensor value 2 is provided in advance with a limit value (an upper limit value and a lower limit value). In this case, the abnormality degree calculation unit 212 calculates the abnormality degree of each of the sensor value 1 and the sensor value 2.

Specifically, first, the abnormality degree calculation unit 212 calculates an approach degree indicating a degree of being close to the abnormality side on which the sensor value is equal to or larger than the limit value. For example, the approach degree is acquired using Equation (1) below.

Approach Degree=(Sensor Value−Limit Value)/(Average Value of Sensor Values−Limit Value)  (1)

As shown in Equation (1), the approach degree becomes a small value ("0") as the sensor value approaches a normal side (sensor average value), and the approach degree becomes a large value as the sensor value approaches the abnormality side. In a case where the limit value includes both of the upper limit value and the lower limit value, the abnormality degree calculation unit 212 calculates both of an approach degree with respect to the upper limit value and an approach degree with respect to the lower limit value.

In addition, the abnormality degree calculation unit 212 calculates the abnormality degree of each sensor value based on the calculated approach degree.

Figure 5:
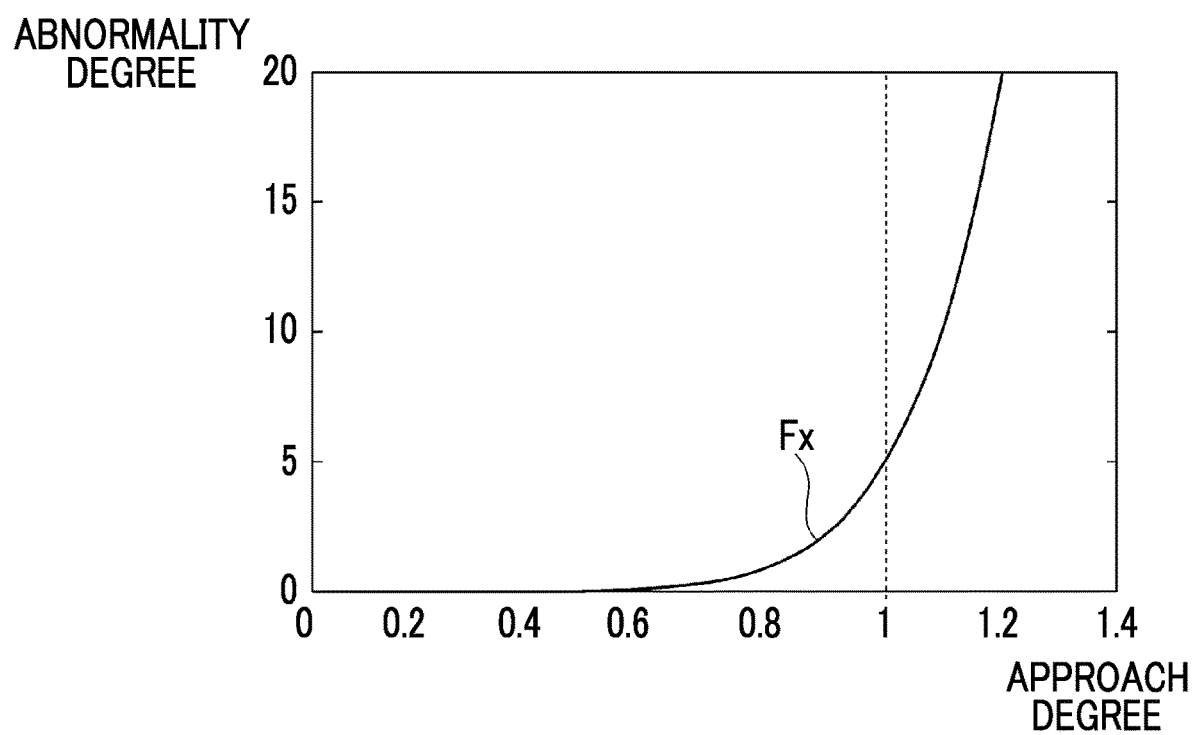
FIG. 5 is a graph showing an example of an abnormality degree according to the embodiment of the present invention.

FIG. 5 is a graph showing an example of the abnormality degree according to the embodiment of the present invention.

The abnormality degree calculation unit 212 has, for example, a function Fx for converting an approach degree into an abnormality degree in advance as shown in FIG. 5, and calculates an abnormality degree corresponding to an approach degree from the function Fx. In the present embodiment, the abnormality degree is adjusted such that a value when the sensor value has reached the limit value matches the threshold value of the Mahalanobis distance. For example, in a case where the threshold value of the Mahalanobis distance is "5", the function Fx is defined such that an approach degree ("1") when the sensor value has reached the limit value is converted into the abnormality degree "5" as shown in FIG. 5. That is, the Mahalanobis distance and the threshold value of the abnormality degree have the same value. In this manner, the abnormality degree calculation unit 212 can handle the abnormality degree with the same measure as the Mahalanobis distance.

Next, the distance calculation unit 213 calculates a distance indicating to what degree the operation state of the plant 1 is separated from the normal operation state at the monitoring timing based on the state quantity acquired in Step S1 and the abnormality degree calculated in Step S2 (Step S3).

Specifically, first, the distance calculation unit 213 calculates the Mahalanobis distance of the state quantity acquired in Step S1 with the unit space stored in the storage unit 25 as a reference. Next, the distance calculation unit 213 calculates a composite distance obtained by correcting the Mahalanobis distance based on the abnormality degree calculated in Step S2. At this time, the distance calculation unit 213 calculates the composite distance using Equation (2) below. In Equation (2), "MD" indicates the "Mahalanobis distance". "MD'" indicates the "composite distance". "x" indicates the abnormality degree of the state quantity of each of characteristic items 1 to n, which is calculated in Step S2.

$$MD'=\sqrt{MD^2+\max(x_1,x_2,...,x_n)^2} \quad (2)$$

That is, Equation (2) above is for acquiring the composite distance MD' as the Euclidean norm of the largest value of abnormality degrees and the Mahalanobis distance MD. Equation (2) above is an example, and the distance calculation unit 213 may calculate the composite distance MD' using a different equation in another embodiment. In addition, at this time, the distance calculation unit 213 may acquire a distance (such as a Manhattan distance) other than the Euclidean norm.

Next, the determination unit 214 determines whether the composite distance MD' determined in Step S3 is equal to or larger than a predetermined threshold value (Step S4). The threshold value is set to, for example, "5". In a case where the composite distance MD' is smaller than the threshold value (smaller than 5) (Step S4: NO), the determination unit 214 determines that the operation state of the plant 1 is normal, and terminates the processing. On the other hand, in a case where the composite distance MD' is equal to or larger than the threshold value (equal to or larger than 5) (Step S4: YES), the determination unit 214 determines that the operation state of the plant 1 is abnormal, and proceeds to the next processing.

Figure 6:
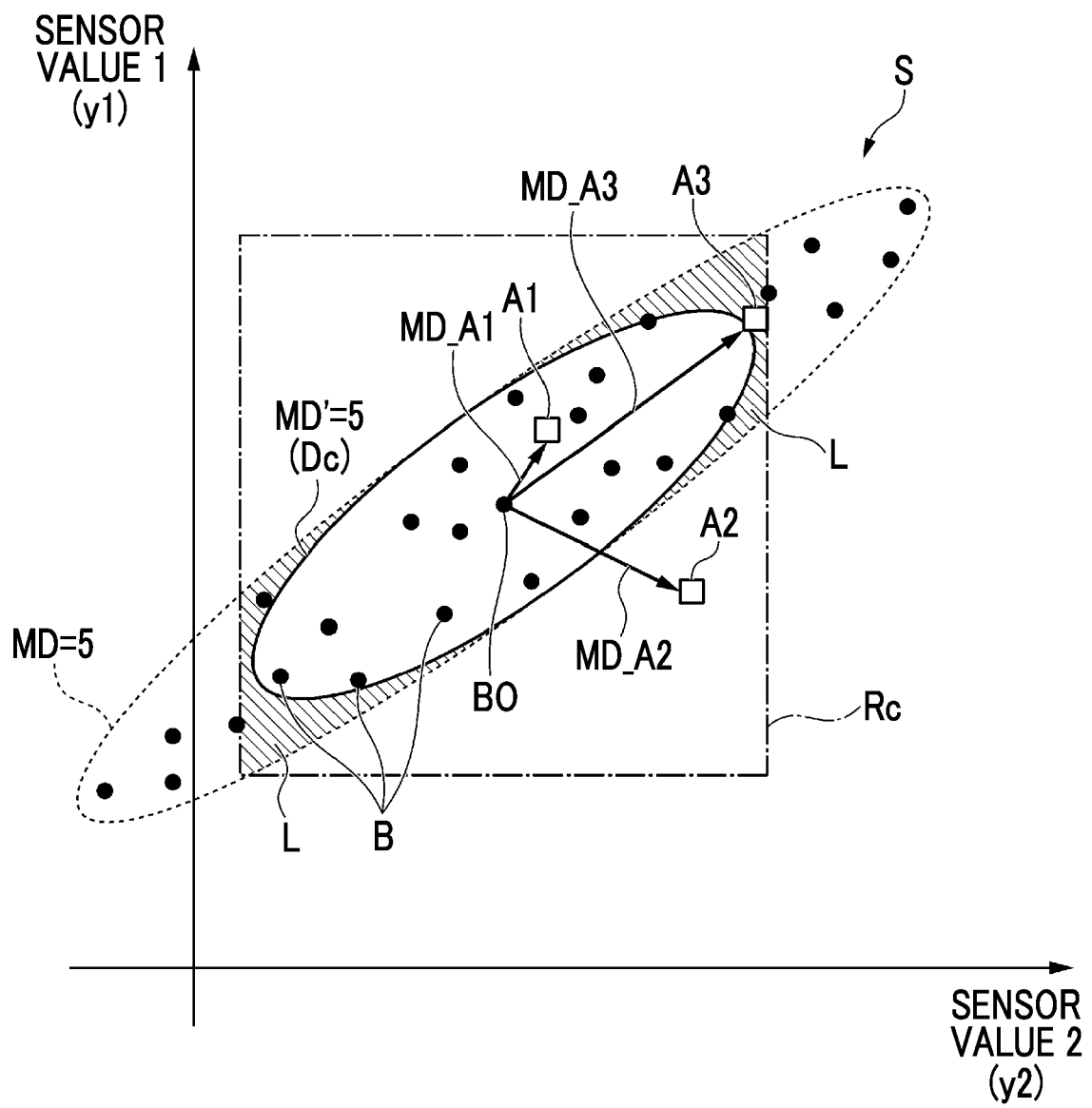
FIG. 6 is a graph showing an example of the Mahalanobis distance in the plant monitoring device according to the embodiment of the present invention.

FIG. 6 is a graph showing an example of the Mahalanobis distance in the plant monitoring device according to the embodiment of the present invention.

FIG. 6 shows a superimposed display of an example of equidistant lines when the value of each of the Mahalanobis distance MD, the composite distance MD', and an abnormality degree x is "5". Since the composite distance MD' is shown by the Euclidean norm of the Mahalanobis distance MD and the maximum value of the abnormality degree x, the composite distance is a value larger than any one of the Mahalanobis distance MD and the abnormality degree x. For this reason, as shown in FIG. 6, the equidistant line of the composite distance MD' is closer to the center of the unit space S than the equidistant lines of the Mahalanobis distances MD are, and is included in the range Rc in which the abnormality degree x is smaller than 5.

In the monitoring method of the related art using the MT method, the presence or absence of an abnormality is determined based on the Mahalanobis distance MD only. In that case, in the example of FIG. 6, since the Mahalanobis distance MD of the state quantity A3 acquired at the certain time t3 is smaller than a threshold value (for example, "3"), it is determined that the operation state of the plant 1 is normal at the time t3. In addition, the maximum value of the abnormality degree x of the state quantity A3 at this time is "3". In this case, since the maximum value of the abnormality degree x is also smaller than the threshold value, in the monitoring method of the related art, it is determined that no abnormality has occurred even when the abnormality degree x of the sensor value 2 has been checked.

On the other hand, the plant monitoring device 20 according to the present embodiment determines the presence or absence of an abnormality based on the composite distance MD', which is the Euclidean norm of the Mahalanobis distance MD and the maximum value of the abnormality degree x. In that case, in the example of FIG. 6, in a case where the value of the Mahalanobis distance MD_A3 of the state quantity A3 acquired at the certain time t3 is "3" and the maximum value of the abnormality degree x is "4", the value of the composite distance MD' is "5" according to Equation (2) above. Therefore, since the composite distance MD' is equal to or larger than the threshold value, the determination unit 214 determines that the operation state of the plant 1 at the time t3 is abnormal (there is a possibility of an abnormality).

As described above, the plant monitoring device 20 according to the present embodiment can determine that the operation state of the plant 1 is abnormal (there is a possibility of an abnormality) even in a region that has been determined to be normal based on the Mahalanobis distance of the related art, the region being a region with a high abnormality degree where the sensor value is close to the limit value (a region L that is shaded in FIG. 6). That is, as the plant monitoring device 20 performs determination based on the composite distance MD', sensitivity with respect to a state quantity with an abnormality degree higher (close to the limit value or exceeding the limit value) than the Mahalanobis distance of the related art can be improved. Therefore, it is possible for the plant monitoring device 20 to detect a sign of an abnormality of the plant 1 at a stage before the abnormality, in which the sensor value actually exceeds the limit value, occurs.

In a case where the determination unit 214 determines that the operation state of the plant 1 is abnormal (Step S4: YES), the S/N ratio calculation unit 215 calculates an S/N ratio for each characteristic item (Step S5).

Specifically, the S/N ratio calculation unit 215 acquires a desired S/N ratio of the presence or absence of an item through the orthogonal array analysis based on the state quantity (the sensor value and the command value) acquired in Step S1. It can be determined that as the S/N ratio increases, a probability that there is an abnormality in the item of the state quantity (the measured value and the command value) increases.

In addition, the S/N ratio calculation unit 215 according to the present embodiment further corrects an S/N ratio for a characteristic item of which the abnormality degree x is equal to or larger than the threshold value. For example, the S/N ratio calculation unit 215 may correct the S/N ratio of the characteristic item of which the abnormality degree x is equal to or larger than the threshold value into a defined value (for example, "6 db"). In addition, the S/N ratio calculation unit 215 may correct the S/N ratio by adding a predetermined value according to the value of the abnormality degree x.

Next, the cause estimation unit 216 estimates a cause of the abnormality of the plant 1 based on the S/N ratio calculated in Step S5 (Step S6). For example, the storage unit 25 stores history information in which a pattern of an S/N ratio for each of characteristic items when abnormalities have occurred in the plant 1 up until now and a factor of the abnormality that has occurred are associated with each other. The cause estimation unit 216 extracts a pattern similar to a pattern of an S/N ratio for each characteristic item calculated in Step S5 from the history information using a technique such as pattern matching. Then, the cause estimation unit 216 extracts a predetermined number (for example, 10) of patterns in descending order of similarity, and estimates that the factors of the abnormalities that have occurred, which are associated with the extracted patterns, are candidates of a cause of the abnormality of the plant 1, which has now occurred.

In addition, the output unit 217 outputs abnormality information including the cause of the abnormality estimated in Step S6 (Step S7). For example, the output unit 217 outputs the abnormality information to the display unit 23 for display. In addition, the output unit 217 may transmit the abnormality information to the terminal device (not shown) of the operator via email. Accordingly, the operator can recognize that the operation state of the plant 1 is abnormal (or that there is a sign of an abnormality) via the display unit 23 or the terminal device, and can easily learn the estimated cause of the abnormality. In addition, the abnormality information may further include a state quantity and an S/N ratio for each characteristic item, and a method of responding to each cause of an estimated abnormality.

(Hardware Configuration of Plant Monitoring Device)

Figure 7:
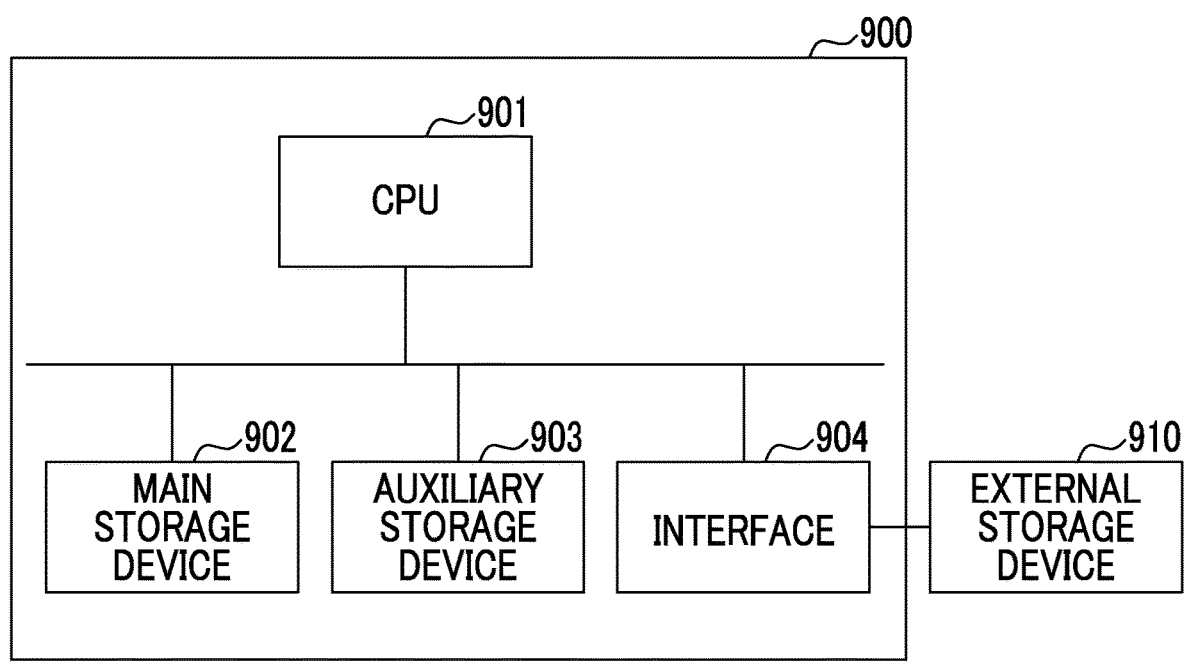
FIG. 7 is a diagram showing an example of a hardware configuration of the plant monitoring device according to the embodiment of the present invention.

FIG. 7 is a diagram showing an example of a hardware configuration of the plant monitoring device according to the embodiment of the present invention.

Hereinafter, the hardware configuration of the plant monitoring device 20 according to the embodiment will be described with reference to FIG. 7.

A computer 900 includes a CPU 901, a main storage device 902, an auxiliary storage device 903, and an interface 904.

The plant monitoring device 20 described above is mounted on the computer 900. Then, an operation of each unit of the plant monitoring device 20 described above is stored in a form of a program in the auxiliary storage device 903 included in each computer 900. The CPU 901 reads the program from the auxiliary storage device 903, deploys the program in the main storage device 902, and executes the processing in accordance with the program. In addition, the CPU 901 secures, in the main storage device 902, a storage area for storing various types of information which is acquired and generated with the processing in accordance with the program. In addition, the CPU 901 secures the storage area for storing data, which is being processed, in the auxiliary storage device 903 in accordance with the program.

The computer 900 is connected to an external storage device 910 via the interface 904, and the storage area may be secured in the external storage device 910.

In at least one embodiment, the auxiliary storage device 903 is an example of a non-transitory tangible medium. Other examples of the non-transitory tangible medium include a magnetic disk, a magneto-optical disk, a CD-ROM, a DVD-ROM, and a semiconductor memory which are connected via the interface 904. In addition, in a case where the program is distributed to the computer 900 via a communication line, the computer 900 that has received the distribution may deploy the program in the main storage device 902 and execute the processing.

In addition, the program may be a program for realizing some of the functions described above. Further, the program may be a program that realizes the functions described above in combination with other programs already stored in the auxiliary storage device 903, that is, a so-called difference file (difference program).

(Operational Effects)

As described above, the plant monitoring device 20 according to the present embodiment includes the state quantity acquisition unit 211 that acquires a state quantity of each of a plurality of characteristic items of the plant 1, the abnormality degree calculation unit 212 that calculates, for the state quantity acquired at the monitoring timing of the plant 1, an abnormality degree indicating a degree of approach to the abnormality side with the limit value set in advance for each characteristic item as a reference, the distance calculation unit 213 that calculates distances of the state quantity and the abnormality degree acquired at the monitoring timing, which indicate a degree of separation from the normal operation state of the plant 1, using a statistical method, and the determination unit 214 that determines the operation state of the plant 1 based on the calculated distances.

By doing so, the plant monitoring device 20 can detect the presence or absence of an abnormality of the plant 1 at an early stage in consideration of the abnormality degree indicating to what degree the state quantity has approached the abnormality side.

In addition, the distance calculation unit 213 calculates the Mahalanobis distance MD of the state quantity acquired at the monitoring timing with the unit space formed by state quantities acquired when the operation state of the plant 1 is normal, and calculates the composite distance MD' obtained by correcting the Mahalanobis distance MD based on a maximum value among a plurality of calculated abnormality degrees. In a case where the composite distance MD' is larger than a predetermined threshold value, the determination unit 214 determines that the operation state of the plant 1 is abnormal.

In the monitoring method using the MT method of the related art, whether or not the state quantity has exceeded the limit value at the monitoring timing has not been monitored. Thus, even when the state quantity is likely to reach the limit value as in the example (state quantity A3) of FIG. 3, it is determined that the operation state is normal based on the Mahalanobis distance in some cases. Therefore, there is a possibility that a sign of an abnormality of the plant 1 cannot be detected at an early stage.

However, in the present embodiment, the plant monitoring device 20 can improve sensitivity with respect to a state quantity with an abnormality degree higher (close to the limit value or exceeding the limit value) than the Mahalanobis distance of the related art by determining the presence or absence of an abnormality based on the composite distance MD' corrected with the abnormality degree as described above. Therefore, it is possible for the plant monitoring device 20 to detect a sign of an abnormality of the plant 1 at a stage before the abnormality, in which the sensor value actually exceeds the limit value, occurs.

Further, the operator may refer to only a determination result based on the composite distance MD' without separately checking a determination result based on the Mahalanobis distance and a determination result based on the limit value as in the related art. For this reason, the plant monitoring device 20 according to the present embodiment can reduce a monitoring load of the operator.

In addition, the abnormality degree calculation unit 212 calculates an abnormality degree such that the value of the abnormality degree when the state quantity has reached the limit value matches the threshold value of the Mahalanobis distance MD.

In this manner, the plant monitoring device 20 can make calculation by the distance calculation unit 213 easy by handling the abnormality degree with the same measure as the Mahalanobis distance MD.

In addition, the plant monitoring device 20 further includes the S/N ratio calculation unit 215 that calculates an S/N ratio for each characteristic item based on the state quantity and the abnormality degree which are acquired at the monitoring timing and the cause estimation unit 216 that estimates a cause of the abnormality of the plant 1 based on the calculated S/N ratio in a case where the determination unit 214 determines that the operation state of the plant 1 is abnormal.

By doing so, the plant monitoring device 20 can more accurately estimate the cause of the abnormality by calculating the S/N ratio in consideration of the abnormality degree.

Although the embodiment of the present invention has been described in detail hereinbefore, the present invention is not limited thereto and can undergo some design changes without departing from the technical gist of the present invention.

For example, although an aspect in which the plant monitoring device 20 calculates the composite distance MD' obtained by correcting the Mahalanobis distance MD based on the abnormality degree (Step S3 of FIG. 4) and determines whether or not the operation state of the plant 1 is normal based on the composite distance MD' (Step S4 of FIG. 4) in the embodiment described above, the invention is not limited thereto.

In another embodiment, the plant monitoring device 20 may perform processing below in Steps S3 to S4. First, the distance calculation unit 213 corrects the state quantity acquired in Step S1 with the abnormality degree calculated in Step S2. Next, the distance calculation unit 213 calculates the Mahalanobis distance of the corrected state quantity with the unit space as a reference (Step S3). In addition, the determination unit 214 determines whether or not the operation state of the plant 1 is abnormal based on whether or not the Mahalanobis distance is equal to or larger than the threshold value (Step S4).

In addition, in still another embodiment, the plant monitoring device 20 may perform processing below in Steps S3 to S4. First, the distance calculation unit 213 calculates the Mahalanobis distance of the abnormality degree calculated in Step S2 with the unit space as a reference (Step S3). In this case, the storage unit 25 stores, in advance, the unit space formed by the abnormality degrees calculated based on the state quantities collected at normal times of the plant 1. In addition, the determination unit 214 determines whether or not the operation state of the plant 1 is abnormal based on whether or not the Mahalanobis distance is equal to or larger than the threshold value (Step S4).

Even in such an aspect, it is possible to obtain the same effect as the embodiment described above.

INDUSTRIAL APPLICABILITY

With the plant monitoring device, the plant monitoring method, and the program according to any one of the aspects described above, an abnormality of the plant can be detected at an early stage.

REFERENCE SIGNS LIST 1 plant
20 plant monitoring device
21 CPU
211 state quantity acquisition unit
212 abnormality degree calculation unit
213 distance calculation unit
214 determination unit
215 S/N ratio calculation unit
216 cause estimation unit
217 output unit
22 input and output interface
23 display unit
24 operation reception unit
25 storage unit
40 control device

The invention claimed is:

1. A plant monitoring device for monitoring an operation state of a plant, the plant monitoring device comprising:
a processor; and
a memory having stored thereon executable instructions, which when executed, cause the processor to perform:
acquiring a state quantity of each of a plurality of characteristic items of the plant;
calculating, for the state quantity acquired at a monitoring timing of the plant, an abnormality degree indicating a degree of approach to an abnormality side with a limit value set in advance for each characteristic item as a reference;
calculating a distance which indicates a degree of separation of the state quantity and the abnormality degree at the monitoring timing from a normal operation state of the plant, using a statistical method; and
determining the operation state of the plant based on the distance,
wherein the processor calculates an approach degree such that a value of the approach degree increases as the state quantity approaches to the abnormality side which is a side exceeding the limit value, and calculates the abnormality degree by converting the approach degree into the abnormality degree such that a value of the abnormality degree when the state quantity reaches the limit value matches a predetermined threshold value of the distance,
wherein the processor calculates a Mahalanobis distance of the state quantity acquired at the monitoring timing with a unit space formed by the state quantity acquired when the operation state of the plant is normal as a reference, and calculates a composite distance as the distance, wherein the composite distance is
a Euclidean norm of the Mahalanobis distance and a maximum value among a plurality of the abnormality degrees, or
a Manhattan distance of the Mahalanobis distance and the maximum value among the plurality of the abnormality degrees, and
wherein the processor determines that the operation state of the plant is abnormal in a case where the composite distance is larger than a predetermined threshold value, and outputs abnormality information to a display unit or a terminal device upon determining that the operation state of the plant is abnormal.

2. The plant monitoring device according to claim 1, wherein the executable instructions, when executed, further cause the processor to perform:
calculating a signal-to-noise ratio for each characteristic item based on the state quantity and the abnormality degree which are acquired at the monitoring timing; and
estimating a cause of an abnormality of the plant based on the calculated signal-to-noise ratio in a case where the determination unit determines that the operation state of the plant is abnormal.

3. The plant monitoring device according to claim 1, wherein the processor calculates the composite distance abnormality degree using the following equation $$MD' = \sqrt{MD^2 + \max(x_1, x_2, \ldots, x_n)^2}$$

where MD' is the composite distance, MD is the Mahalanobis distance, and x is the abnormality degree of the state quantity.

4. A plant monitoring method for monitoring an operation state of a plant, the plant monitoring method comprising:
acquiring a state quantity of each of a plurality of characteristic items of the plant;
calculating, for the state quantity acquired at a monitoring timing of the plant, an abnormality degree indicating a degree of approach to an abnormality side with a limit value set in advance for each characteristic item as a reference;
calculating a distance which indicates a degree of separation of the state quantity and the abnormality degree at the monitoring timing from a normal operation state of the plant, using a statistical method; and
determining the operation state of the plant based on the calculated distance,
wherein in the calculating of the abnormality degree, an approach degree is calculated such that a value of the approach degree increases as the state quantity approaches to the abnormality side which is a side exceeding the limit value, and the abnormality degree is calculated by converting the approach degree into the abnormality degree such that a value of the abnormality degree when the state quantity reaches the limit value matches a predetermined threshold value of the distance, wherein in the calculating of the distance, a Mahalanobis distance of the state quantity acquired at the monitoring timing with a unit space formed by the state quantity acquired when the operation state of the plant is normal as a reference is calculated, and a composite distance is calculated as the distance, wherein the composite distance is a Euclidean norm of the Mahalanobis distance and a maximum value among a plurality of the abnormality degrees, or a Manhattan distance of the Mahalanobis distance and the maximum value among the plurality of the abnormality degrees, and wherein in the determining of the operation state, it is determined that the operation state of the plant is abnormal in a case where the composite distance is larger than a predetermined threshold value, and abnormality information is output to a display unit or a terminal device upon determining that the operation state of the plant is abnormal.

5. A non-transitory computer readable media storing a program thereon that causes a computer of a plant monitoring device for monitoring an operation state of a plant to function, the program causing the computer to execute:

acquiring a state quantity of each of a plurality of characteristic items of the plant;

calculating, for the state quantity acquired at a monitoring timing of the plant, an abnormality degree indicating a degree of approach to an abnormality side with a limit value set in advance for each characteristic item as a reference;

calculating a distance which indicates a degree of separation of the state quantity and the abnormality degree at the monitoring timing from a normal operation state of the plant, using a statistical method; and determining the operation state of the plant based on the calculated distance, wherein in the calculating of the abnormality degree, an approach degree is calculated such that a value of the approach degree increases as the state quantity approaches to the abnormality side which is a side exceeding the limit value, and the abnormality degree is calculated by converting the approach degree into the abnormality degree such that a value of the abnormality degree when the state quantity reaches the limit value matches a predetermined threshold value of the distance, wherein in the calculating of the distance, a Mahalanobis distance of the state quantity acquired at the monitoring timing with a unit space formed by the state quantity acquired when the operation state of the plant is normal as a reference is calculated, and a composite distance is calculated as the distance, wherein the composite distance is a Euclidean norm of the Mahalanobis distance and a maximum value among a plurality of the abnormality degrees, or a Manhattan distance of the Mahalanobis distance and the maximum value among the plurality of the abnormality degrees, and wherein in the determining of the operation state, it is determined that the operation state of the plant is abnormal in a case where the composite distance is larger than a predetermined threshold value.

* * * * *